United States Patent
Tsai et al.

(10) Patent No.: US 7,842,201 B2
(45) Date of Patent: Nov. 30, 2010

(54) SYSTEM FOR MANUFACTURING MICRO-RETARDER AND METHOD FOR MANUFACTURING THE SAME

(75) Inventors: Chao-Hsu Tsai, Hsinchu (TW); Kuo-Chung Huang, Taipei County (TW); Chun-Fu Lu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/483,562

(22) Filed: Jun. 12, 2009

(65) Prior Publication Data

US 2009/0250827 A1 Oct. 8, 2009

Related U.S. Application Data

(62) Division of application No. 12/195,645, filed on Aug. 21, 2008.

(30) Foreign Application Priority Data

Jan. 4, 2008 (TW) .............................. 97100388 A (51) Int. Cl.
  *B29D 7/01* (2006.01)
(52) U.S. Cl. .................. 264/1.34; 264/1.37; 425/174.4
(58) Field of Classification Search ................ 264/1.34, 264/1.37; 425/174.4; 33/1.34
  See application file for complete search history.

(56) References Cited

U.S. PATENT DOCUMENTS

| 4,350,867 | A | * | 9/1982 | Kinoshita et al. ...... 219/121.63 |
| 4,714,628 | A | | 12/1987 | Eloy |
| 4,913,934 | A | | 4/1990 | Sharp et al. |
| 5,067,811 | A | * | 11/1991 | Ouchi ......................... 356/121 |
| 6,099,786 | A | | 8/2000 | Hu et al. |
| 6,498,679 | B2 | | 12/2002 | Lee et al. |
| 6,509,983 | B1 | * | 1/2003 | Klug ............................ 359/35 |
| 6,577,799 | B1 | * | 6/2003 | Charters et al. ............. 385/123 |
| 7,449,679 | B2 | * | 11/2008 | Plewa et al. .................. 250/251 |
| 2002/0075533 | A1 | * | 6/2002 | Kang et al. .................... 359/35 |
| 2007/0134442 | A1 | * | 6/2007 | Matsunaga et al. ........... 428/1.3 |

FOREIGN PATENT DOCUMENTS

JP 2002096188 4/2002

OTHER PUBLICATIONS

English abstract of JP2002096188.

\* cited by examiner

*Primary Examiner*—Philip C Tucker
*Assistant Examiner*—Amjad Abraham
(74) *Attorney, Agent, or Firm*—Thomas, Kayden, Horstemeyer & Risley (57) ABSTRACT

A system for manufacturing a micro-retarder and a method for manufacturing the same are provided. The system for manufacturing a micro-retarder includes a carrying device, a heating device and a movement control device. The carrying device is used for carrying a polymolecule film. The polymolecule film is selected from a polymolecule film having an arrangement direction. The heating device is used for providing a heating source. The energy formed in the central area of the heating source is smaller than that in the peripheral area of the heating source. The movement control device is used for controlling the heating source and the polymolecule film to relatively move along a first direction, so that the adjusted heating source heats at least one partial area of the polymolecule film along the first direction and resumes the partial area of the polymolecule film to be non-directional.

7 Claims, 10 Drawing Sheets

SYSTEM FOR MANUFACTURING MICRO-RETARDER AND METHOD FOR MANUFACTURING THE SAME

CROSS-REFERENCE TO RELATED APPLICATION

This application is a division of U.S. patent application Ser. No. 12/195,645, filed Aug. 21, 2008 and entitled "System For Manufacturing Micro-Retarder And Method For Manufacturing The Same," which claims the benefit of Taiwan application Serial No. 097100388, filed Jan. 4, 2008, the subject matter of which is incorporated herein by reference.

BACKGROUND OF THE INVENTION

1. Field of the Invention

The invention relates in general to a system for manufacturing a micro-retarder and a method for manufacturing the same, and more particularly to a system for manufacturing a micro-retarder by way of heat treatment and a method for manufacturing the same.

2. Description of the Related Art

Figure 1:
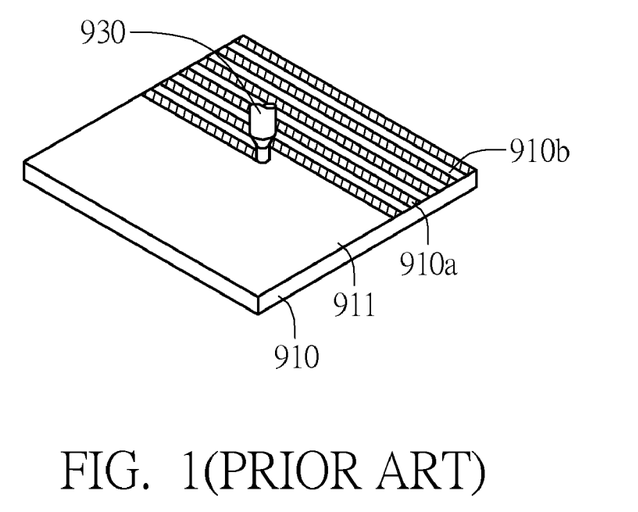
FIG. 1 (Prior Art) shows a perspective of a conventional method for manufacturing a micro-retarder.

Referring to FIG. 1, a perspective of a conventional method for manufacturing a micro-retarder 910 is shown. The micro-retarder 910 is a key parts of a 3-D display device. As indicated in FIG. 1, the polymolecule film 911 is optically anisotropic in its molecule structure, which induces optical anisotropism on the material. Optical phase delay between different axes occurs after the polarized light passes through the polymolecule film 911. The conventional method for manufacturing the micro-retarder 910 heats a particular partial area of the polymolecule film 911 by a heating source 930 so as to resume the polymolecule film 911 to be optically isotropic. The heated partial area 910a is alternated with the unheated partial area 910b, thereby forming a micro-retarder 910.

Figure 2:
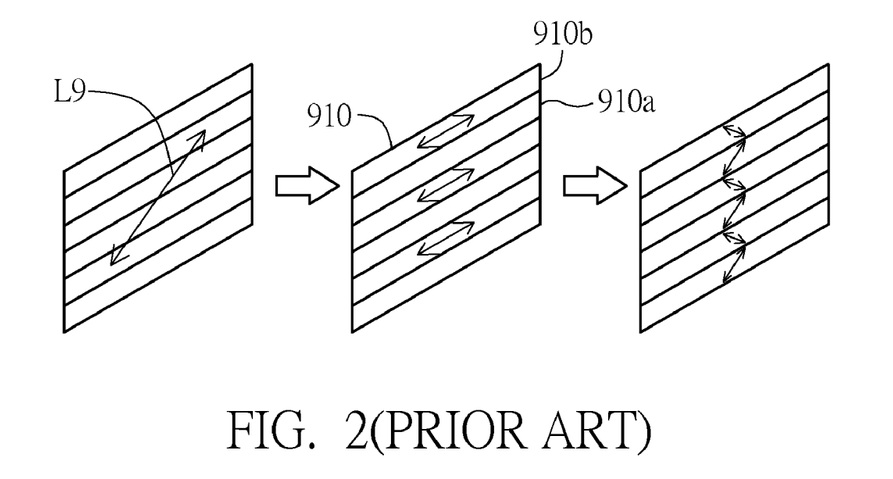
FIG. 2 (Prior Art) shows a perspective of a polarized light passing through a micro-retarder.

Referring to FIG. 2, a perspective of a polarized light L9 passing through a micro-retarder 910 is shown. The polarized light L9 is split into two polarized directions after passing through the micro-retarder 910. When the polarized light L9 passes through the heated partial area 910a, optical phase delay does not occur to the polarized light L9. When the polarized light L9 passes through the unheated partial area 910b, optical phase delay occurs to the polarized light L9. When the quantity of the optical phase delay is selected as 7 and the angle between the direction of the polarized light L9 and the optical axis of the phase retarder plate 911 is 45 degrees, the polarization direction of the polarized light L9 after passing through the unheated partial area 910b will be rotated by 90 degrees. As indicated in FIG. 2, the polarization directions of the light passes through the heated partial area 910a and unheated partial area 910b become orthogonal to each other. Thus, the micro-retarder 910 can be applied in a 3-D display device to create a 3-D image effect.

Figure 3:
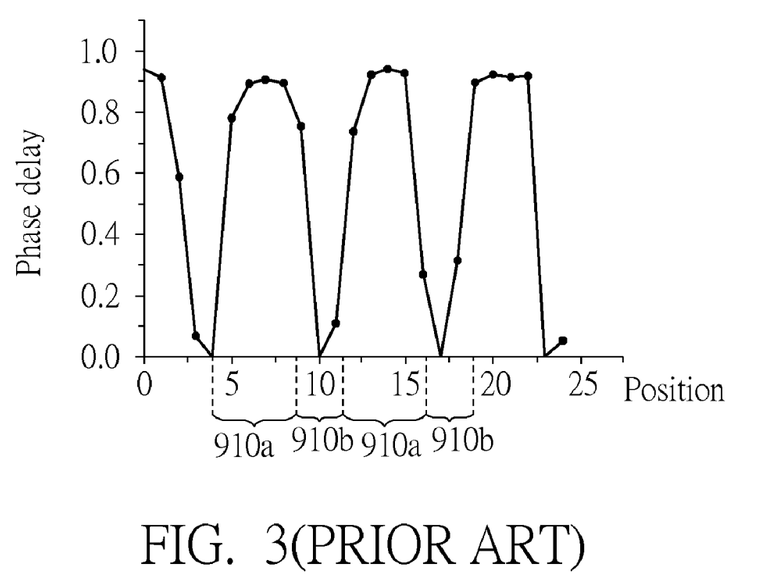
FIG. 3 (Prior Art) shows a retardation curve of a micro-retarder fabricated by a conventional method.

Referring to FIG. 3, a retardation curve of a micro-retarder 910 fabricated by a conventional method is shown. In FIG. 3, the X-axis denotes position, and the Y-axis denotes phase delay. When the conventional heating source 930 heats the polymolecule film 911, the heating energy is distributed unevenly and heating energy diffuses.

Figure 4:
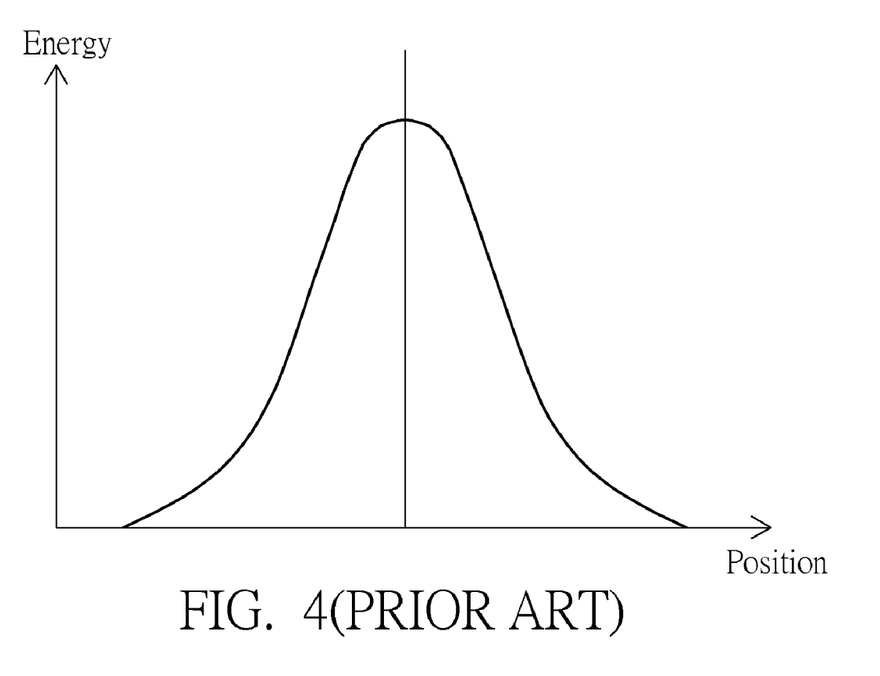
FIG. 4 (Prior Art) shows a cross-sectional energy distribution diagram of the laser light adopting $TEM_{00}$.

Referring to FIG. 4. FIG. 4 shows a cross-sectional energy distribution diagram of the laser light adopting $TEM_{00}$. Particularly, when the laser beam adopting $TEM_{00}$ is used as a heating source 930, the energy distribution is a Gaussian distribution curve where the energy in central area is higher than that in the peripheral area. Thus, the distribution of the heating energy becomes even more uneven. As indicated in FIG. 3, the change between the heated partial area 910a and the unheated partial area 910b is depicted by a smooth curve not a steep line. That is, the phase delay in the border of the heated partial area 910a is not significantly different from that in the unheated partial area 910b. Thus, the conventional micro-retarder 910 will result in problem of poor stereo contrast.

SUMMARY OF THE INVENTION

The invention is directed to a system for manufacturing a micro-retarder and a method for manufacturing the same. The design of the invention incorporates a movement control device, a measuring device, a cooling device, a polarization adjusting device and a reflector set, not only making the level of phase delay in the heated partial area of the micro-retarder significantly different from that in the unheated partial area but also making the manufacturing process even more convenient.

According to a first aspect of the present invention, a system for manufacturing a micro-retarder is provided. The system for manufacturing a micro-retarder includes a carrying device, a heating device and a movement control device. The carrying device is used for carrying a polymolecule film. The polymolecule film is selected from a polymeric film which is optically anisotropic. The heating device is used for providing a heating source. The energy formed in the central area of the heating source is smaller than that in the peripheral area of the heating source. The movement control device is used for controlling the heating source and the polymolecule film to relatively move along a first direction, so that the adjusted heating source heats at least one partial area of the polymolecule film along the first direction and resumes the partial area of the polymolecule film to be optically isotropic.

According to a second aspect of the present invention, a method for manufacturing a micro-retarder is provided. The method includes the following steps. Firstly, a polymolecule film that is optically anisotropic is provided. Next, a heating source is provided, wherein the energy formed in the central area of the heating source is smaller than that in the peripheral area of the heating source. Then, the polymolecule film and the heating source are relatively moved along a first direction, so that the heating source heats at least one partial area of the polymolecule film along the first direction and resumes the partial area of the polymolecule film to be optically isotropic.

According to a third aspect of the present invention, a system for manufacturing a micro-retarder is provided. The system includes a carrying device, a heating device, a polarization adjusting device and a movement control device. The carrying device is for carrying a polymolecule film which is optically anisotropic. The heating device is for providing a laser beam. The polarization adjusting device is for adjusting a polarized angle of the laser beam according to the optical axis direction of the polymolecule film. The movement control device is for controlling the carrying device and the heating device to relatively move along a first direction, so that the adjusted heating source heats at least one partial area of the polymolecule film along the first direction and resumes the partial area of the polymolecule film to be optically isotropic.

According to a fourth aspect of the present invention, a method for manufacturing a micro-retarder is provided. The method includes the following steps: Firstly, a polymolecule film that is optically anisotropic is provided. Next, a laser beam is provided. Then, a polarized angle of the laser beam is adjusted according to the optical axis direction of the polymolecule film. Afterwards, the polymolecule film and the laser beam are relatively moved along a first direction, so that the laser beam heats at least one partial area of the polymolecule film along the first direction and resumes the partial area of the polymolecule film to be optically isotropic.

The invention will become apparent from the following detailed description of the preferred but non-limiting embodiments. The following description is made with reference to the accompanying drawings.

DETAILED DESCRIPTION OF THE INVENTION

First Embodiment

Figure 5:
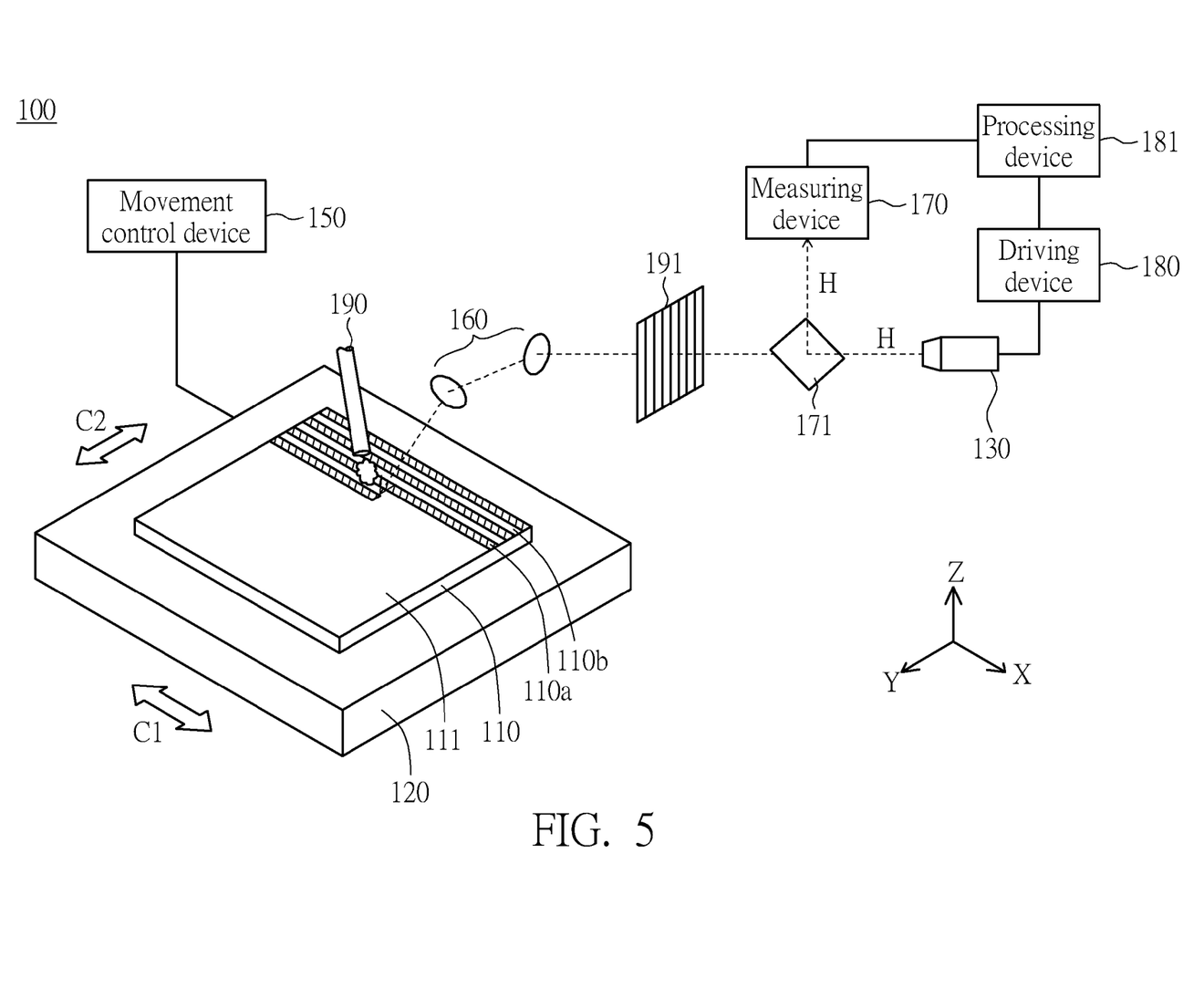
FIG. 5 shows a manufacturing system of a micro-retarder according to a first embodiment of the invention.

Referring to FIG. 5, a manufacturing system 100 of a micro-retarder 110 according to a first embodiment of the invention is shown. The manufacturing system 100 of the micro-retarder 110 includes a carrying device 120, a heating device 130 and a movement control device 150.

The carrying device 120 is used for carrying a polymolecule film 111. In the present embodiment of the invention, the carrying device 120 is exemplified as a carrying platform.

The heating device 130 provides a heating source H. Examples of the heating source H include a laser beam, an infra-red light, an ultra-sound wave, an electron beam and a neutron beam. In the present embodiment of the invention, the heating source H is exemplified as a $CO_2$ laser beam. The manufacturing system 100 of the micro-retarder 110 further includes a reflector set 160 for reflecting the heating source H onto the polymolecule film 111.

Figure 6:
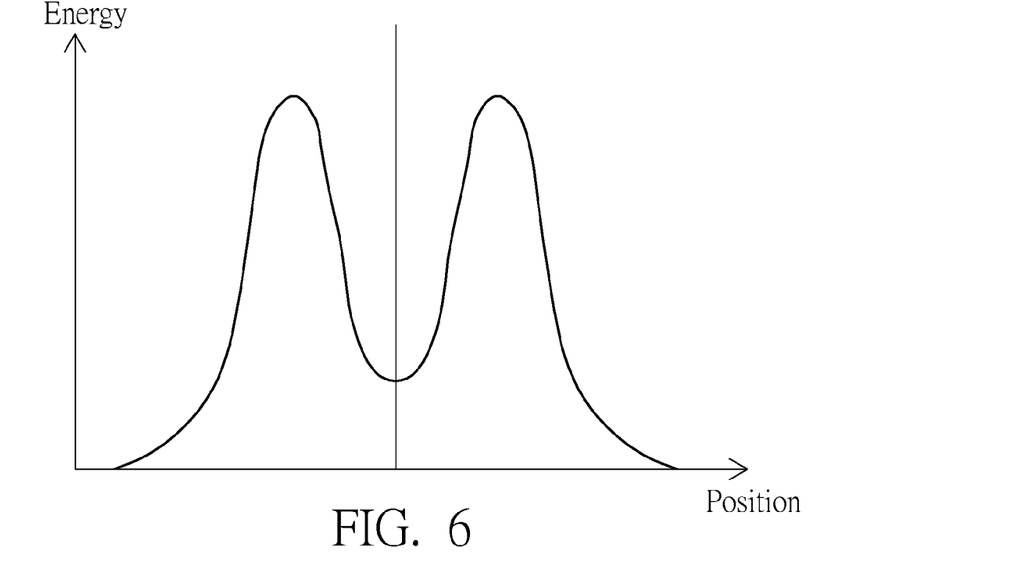
FIG. 6 shows a cross-sectional distribution diagram along dual peaks of the laser light adopting $TEM_{01}$, $TEM_{10}$ and $TEM_{11}$.

In the present embodiment of the invention, the energy formed in the center of the heating source H is lower than that formed in the peripheral area. Let the laser beam be taken for example. The transverse electromagnetic mode (TEM) of the laser beam is selected from $TEM_{01}$, $TEM_{10}$ or $TEM_{11}$. Referring to FIG. 6. FIG. 6 shows a cross-sectional distribution diagram along dual peaks of the laser light adopting $TEM_{01}$, $TEM_{10}$ and $TEM_{11}$. As indicated in FIG. 6, the 3-D energy distribution of the laser light when the transverse electromagnetic mode adopts $TEM_{01}$, $TEM_{10}$ and $TEM_{11}$ is an inverse Gaussian distribution curve, wherein the centranergy in the central area is smaller than that in the peripheral area.

The movement control device 150 for controlling the heating source H and the polymolecule film 111 to relatively move can be a stepping motor or a server motor. The movement control device 150 can perform that function by way of controlling the movement of the carrying device 120 or the movement of the heating device 130, or directly controlling the reflection path of the heating source H. In the present embodiment of the invention, the controlling mode of the movement control device 150 is exemplified by controlling the movement of the carrying device 120.

Figure 7:
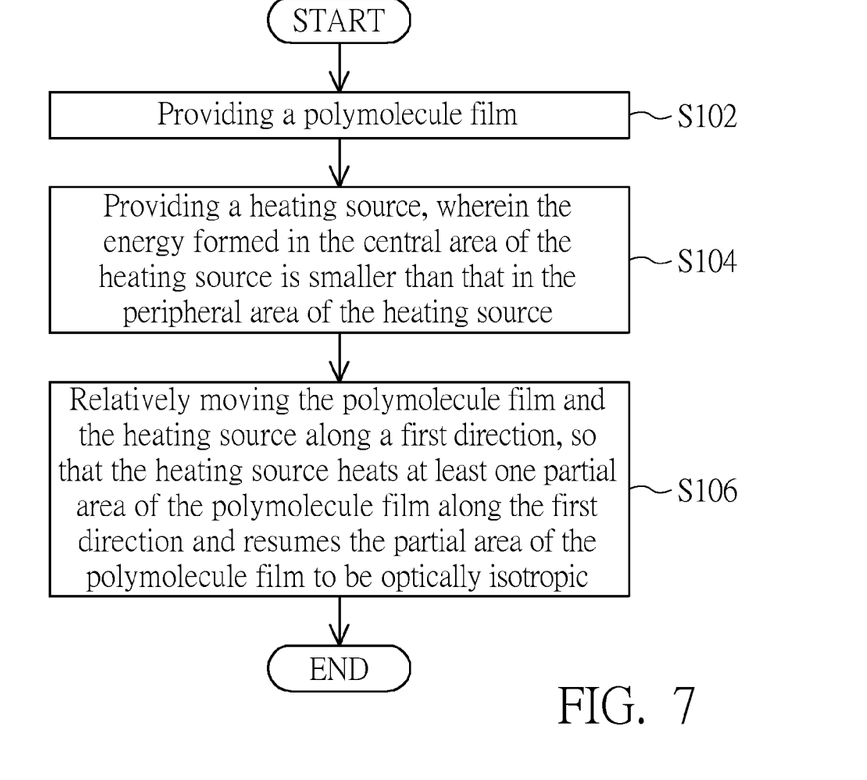
FIG. 7 shows a flowchart of a method for manufacturing a micro-retarder according to a first embodiment of the invention.

Referring to FIG. 7, a flowchart of a method for manufacturing a micro-retarder 100 according to a first embodiment of the invention is shown. The manufacturing method of the micro-retarder 100 according to the first embodiment of the invention is stated below.

Firstly, the method begins at step S102, the above-mentioned polymolecule film 111 is disposed on the carrying device 120.

Next, the method proceeds to step S104, the heating source H is provided by the heating device 130, wherein the energy formed in the central area of the heating source H is smaller than that in the peripheral area.

Then, the method proceeds to step S106, the heating source H and the polymolecule film 111 are relatively moved along a first direction C1 by the movement control device 150, so that the heating source H heats at least one partial area 110a of the polymolecule film 111 along the first direction C1 and resumes the partial area 110a of the phase retardation 111 to be optically isotropic.

After the heating source H completes heat treatment on a partial area 110a, the movement control device 150 further controls the polymolecule film 111 and the heating source H to relatively move along a second direction C2, so that the heating source H performs heat treatment to another partial area 110a. The second direction C2 is substantially perpendicular to the first direction C1, wherein the first direction C1 and the second direction C2 are respectively the X-axial direction and the Y-axial direction of FIG. 5.

When the movement control device 150 controls the carrying device 120 to move along the first direction C1 and the second direction C2, the heating source H is enabled to relatively move along the first direction C1 and the second direction C2.

Figure 8:
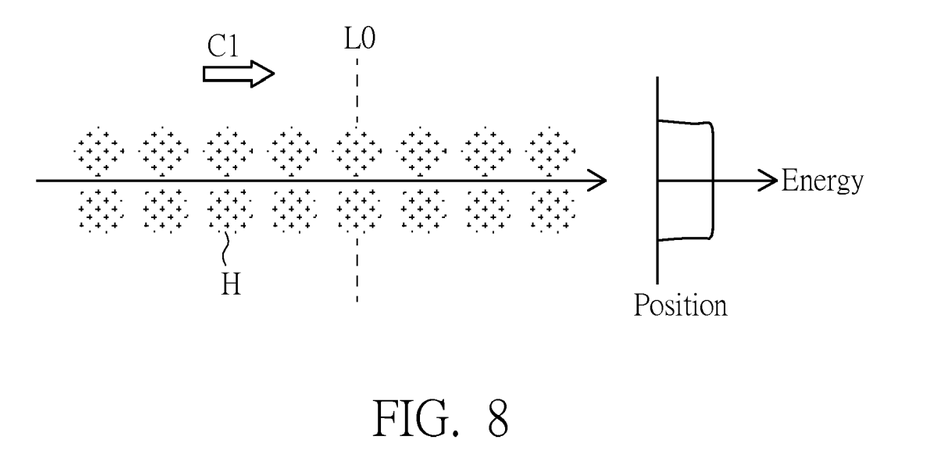
FIG. 8 shows an energy accumulation diagram of the heating source of the first embodiment moving along the first direction.

Referring to FIG. 8, an energy accumulation diagram of the heating source H of the first embodiment moving along the first direction C1 is shown. The energy formed in the central area of the heating source H is smaller than that formed in the peripheral area. When the heating source H moves along the first direction C1 and passes the measuring line L0, the accumulation of energy is indicated at the right-hand side of FIG. 8. Thus, after the heating source H completes heat treatment on a partial area 110a (illustrated in FIG. 5), energy is evenly received by the partial area 110a and the moleculous arrangement in the whole width of the heated partial area 100a is uniform and significantly different from that in the unheated partial area 110b (illustrated in FIG. 5).

Also referring to FIG. 5, the manufacturing system 100 of the micro-retarder 110 further includes a measuring device 170, a splitting device 171, a driving device 180 and a processing device 181. The splitting device 171 disposed between the heating device 130 and the reflector set 160 is for reflecting a part of the heating source H to the measuring device 170. The splitting device 171 can be a beam-splitting half-mirror. By means of the measuring device 170 and the splitting device 171, the manufacturing method of the micro-retarder 110 of the present embodiment of the invention further includes the following feedback adjusting steps.

Firstly, a heating energy of the heating source H is measured by the measuring device 170. In the present embodiment of the invention, the measuring device 170 receives a partial laser beam and then measures the power of the received laser beam accordingly.

Next, the heating device 130 adjusts a driving energy of the heating source H according to the heating energy. For example, if the processing device 181 determines that the heating energy drops to a first level from a predetermined level, then the control driving device 180 increases the driving energy of the heating device 130 until the heating energy resumes the predetermined level. If the processing unit 181 determines that the heating energy has increased to a second level, then the control driving device 180 decreases the driving energy of the heating device 130 until the heating energy resumes the predetermined level. Therefore, the heating energy of the heating source H remains stable over the time.

Also, referring to FIG. 5, the manufacturing system 100 of the micro-retarder 110 further includes a cooling device 190 for cooling the heated partial area 110a. The manufacturing method of the micro-retarder 110 further promptly reduces the heat of the heated partial area 110a via the step of cooling the heated partial area 110a, so that the heat of the heated partial area 110a will not be diffused to the unheated partial area 110b. Thus, the moleculous arrangement in the whole width of the heated partial area 110a is uniform and significantly different from that in the unheated partial area 110b.

Besides, the manufacturing system 100 of the micro-retarder 110 of the present embodiment of the invention further includes a polarization adjusting device 191 such as a polarizer. The polarization adjusting device 191 is disposed on the transmission path of the laser beam. The polymolecule film 111 is optically isotiopic already before the polymolecule film 111 is heated. The manufacturing method of the micro-retarder 110 further adjusts the polarized angle of the laser beam according to the optical axis direction of the polymolecule film 111. For example, the polarized direction of the laser beam is adjusted to be parallel or perpendicular to the optical axis direction of the polymolecule film 111 or form a particular angle with the optical axis direction of the polymolecule film 111. The adjustment of the polarized angle is based on actual operating parameters such as the type of the laser beam or the material of the polymolecule film 111.

After the laser beam adjusts the polarized angle, the laser beam is projected onto the polymolecule film 111 so that the heat diffusion speed of the polymolecule film 111 is reduced. Thus, the difference between the moleculous arrangement in the heated partial area 110a and that in the unheated partial area 110b is still significant.

Second Embodiment

Figure 9:
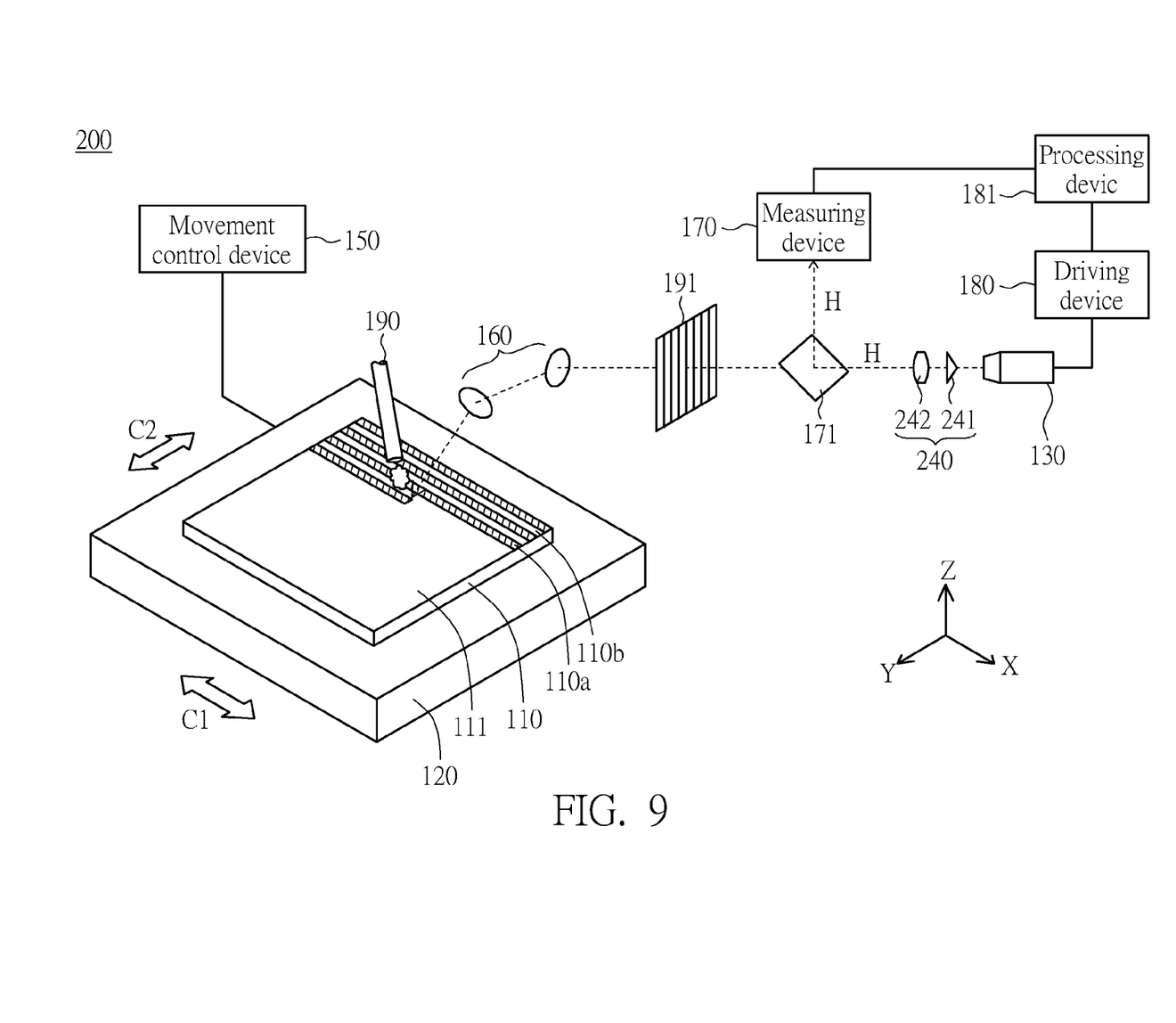
FIG. 9 shows a manufacturing system of a micro-retarder according to a second embodiment of the invention.

Referring to FIG. 9, a manufacturing system 200 of a micro-retarder 110 according to a second embodiment of the invention is shown. The manufacturing system 200 of the micro-retarder 110 of the present embodiment of the invention and the method for manufacturing the same differs from the manufacturing system 100 of the micro-retarder 110 of the first embodiment and the method for manufacturing the same in that the manufacturing system of the micro-retarder 110 further includes a conical lens 241 and a focusing lens 242 and that the laser beam outputted by the heating device 130 adopts $TEM_{00}$, and other similarities are not repeated here.

Figure 10:
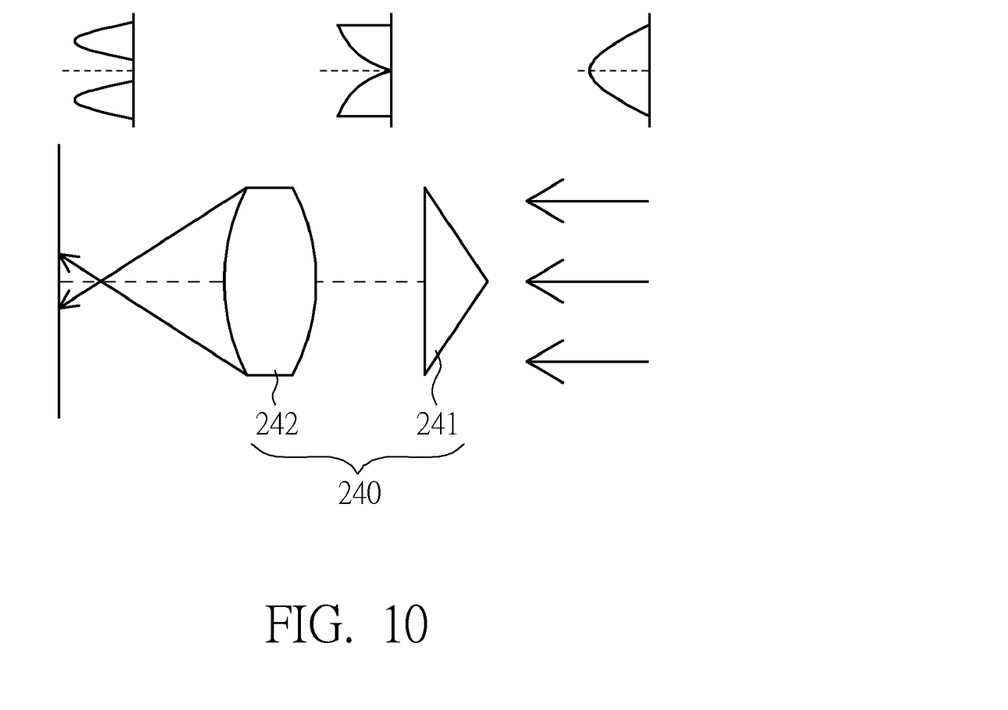
FIG. 10 shows an energy distribution diagram of a laser beam passing through a conical lens and a focusing lens.

Referring to FIG. 10, an energy distribution diagram of a laser beam passing through a conical lens 241 and a focusing lens 242 is shown. The conical lens 241 deflects the energy formed in the central area of the laser beam, so that the energy formed in the center of the laser beam is smaller than that in the peripheral area of the heating source H. When the laser beam passes through the conical lens 241, the distribution of the laser beam energy changes to a valley distribution curve from a Gaussian distribution curve. After the laser beam passes through the focusing lens 242, the distribution of the laser beam energy changes to an inverse Gaussian distribution curve from the valley distribution curve. Thus, through the design of combining the conical lens 241 and the focusing lens 242, the present embodiment of the invention also enables the energy in the central area of heating source H to be smaller than that in the peripheral area.

Figure 11:
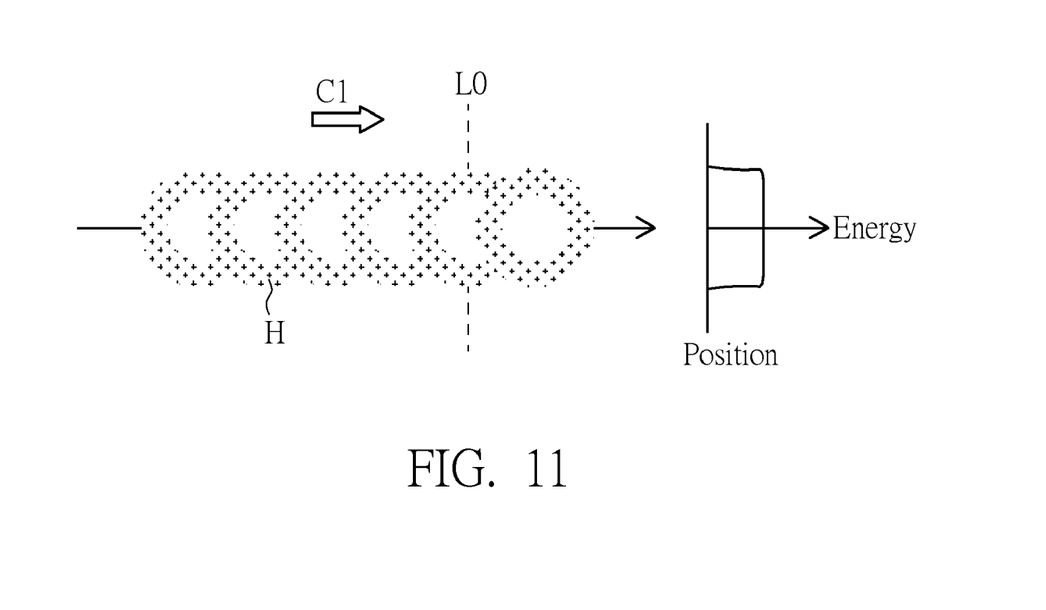
FIG. 11 shows an energy accumulation diagram of the heating source of the second embodiment moving along the first direction.

Referring to FIG. 11, an energy accumulation diagram of the heating source H of the second embodiment moving along the first direction C1 is shown. The energy in the central area of the heating source H is smaller than that in the peripheral area, and the shape of the distribution of the heat is like a donut. When the heating source H moves along the first direction C1 and passes the measuring line L0, the energy accumulation is indicated at the right-hand side of FIG. 11. Thus, after the heating source H completes heat treatment on a partial area 110a (illustrated in FIG. 9), energy is evenly received by the partial area 110a and the moleculous arrangement in whole width of the heated partial area 100a is uniform and significantly different from that in the unheated partial area 110b (illustrated in FIG. 9).

Figure 12A:
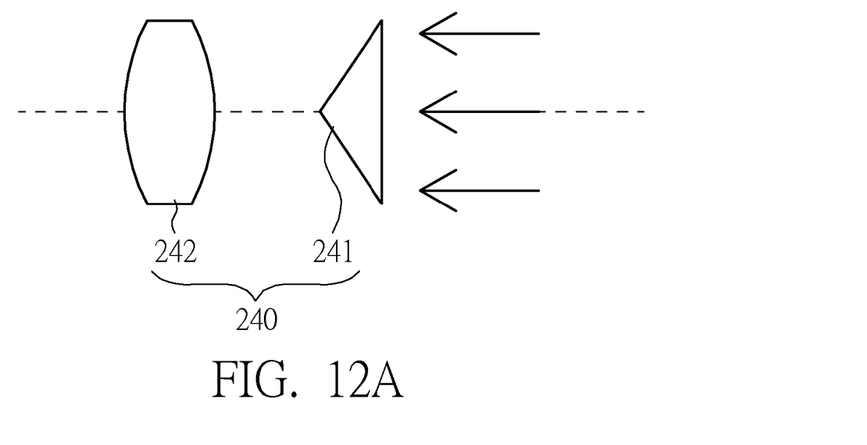
FIG. 12A~12C show other disposition diagrams of the conical lens and focusing lens of FIG. 10.
Figure 12B:
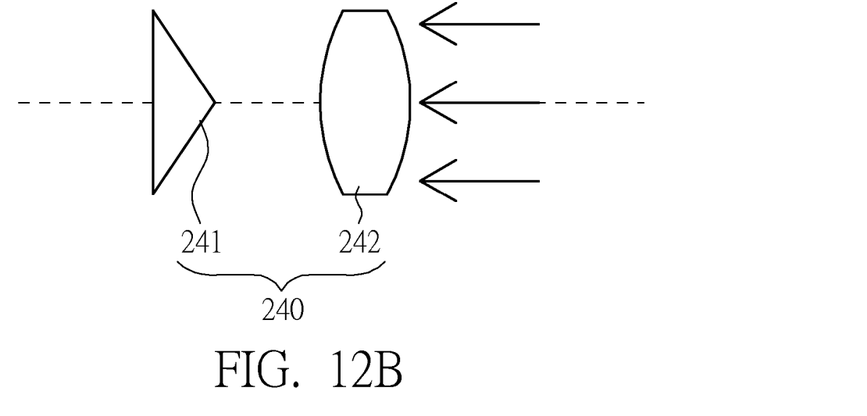
Figure 12C:
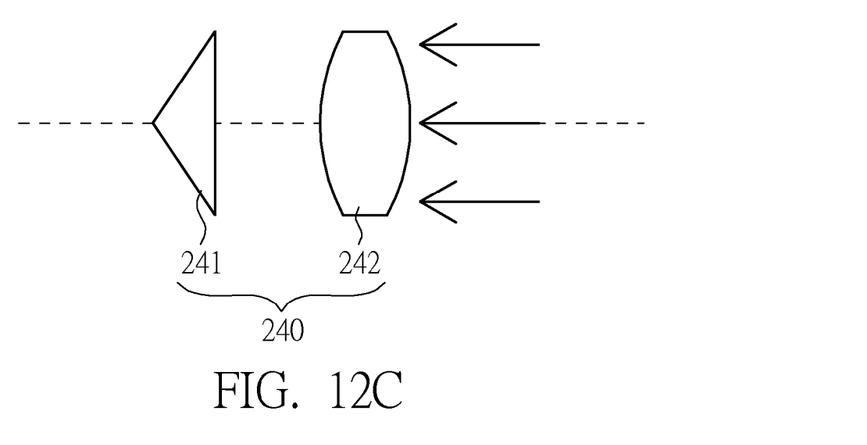

Referring to FIGS. 12A~12C, other disposition diagrams of the conical lens 241 and focusing lens 14 of FIG. 10 are shown. Despite the conical lens 241 and the focusing lens 242 of the present embodiment of the invention are exemplified as the disposition in FIG. 10, the disposition of the conical lens 241 and the focusing lens 242 is not limited thereto. For example, the conical lens 241 can be disposed in front of the focusing lens 242 or vice versa, or the conical lens 241 can be disposed with the front side or the back side facing the focusing lens 242 as indicated in FIGS. 12A~12C.

Third Embodiment

Figure 13:
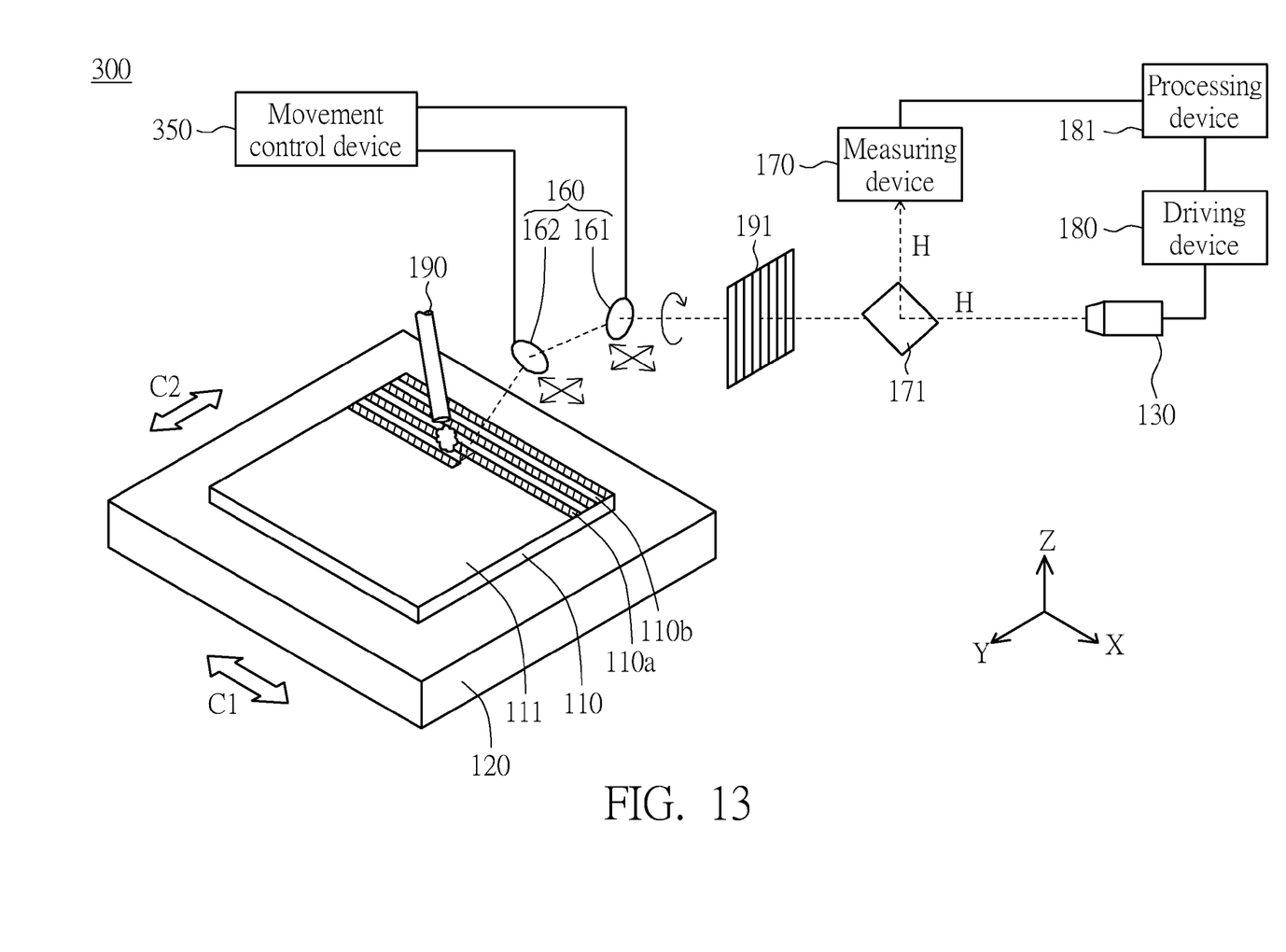
FIG. 13 shows a manufacturing system of a micro-retarder according to a third embodiment of the invention.

Referring to FIG. 13, a micro-retarder 110 of a manufacturing system 300 according to a third embodiment of the invention is shown. The manufacturing system 300 of the micro-retarder 110 of the present embodiment of the invention and the method for manufacturing the same differs from the manufacturing system 100 of the micro-retarder 110 of the first embodiment and the method for manufacturing the same in that the movement control device 350 does not control the movement of the carrying device 120 but controls the reflection path of the heating source H, and other similarities are not repeated here.

As indicated in FIG. 13, the reflector set 160 includes a first reflector 161 and a second reflector 162. After the first reflector 161 and the second reflector 162 reflect the heating source H, the heating source H is projected onto the polymolecule film 111. The movement control device 350 can control the second reflector 162 to move along the first direction C1 and control the first reflector 161 the second reflector 162 to move passively along the first direction C1. That is, the first reflector 161 moves along the first direction C1 with the second reflector 162, so that the heating source H reflected by the first reflector 161 is still projected onto the second reflector 162, and the position in which the heating source H is projected onto the polymolecule film 111 moves along the first direction C1. The movement control device 350 can further control the second reflector 162 to move along the second direction C2 and control the first reflector 161 to move passively with the second reflector 162. That is, the first reflector 161 rotates with the second reflector 162, so that the heating source H reflected by the first reflector 161 is still projected onto the second reflector 162, and that the position on which the heating source H is projected onto the polymolecule film 111 moves along the second direction C2.

The ways of controlling the reflector set 160 are not limited to the above mentioned. For example, the reflector set 160 can be controlled in the following ways. The movement control device 350 can control the first reflector 161 to move along the first direction C1 and control the second reflector 162 to move along the first direction C1 passively with the first reflector 161. That is, the second reflector 162 moves along the first direction C1 with the first reflector 161, so that the heating source H reflected by the first reflector 161 is still projected onto the second reflector 162, and that the position on which the heating source H is projected onto the polymolecule film 111 moves along the first direction C1. The movement control device 350 can further control the first reflector 161 to move along the second direction C2 and control the second reflector 162 to move with the first reflector 161 passively. That is, the second reflector 162 rotates with the first reflector 161, so that the heating source H reflected by the first reflector 161 is still projected onto the second reflector 162, and that the position on which the heating source H is projected onto the polymolecule film 111 moves along the second direction C2.

Thus, the position on which the heating source H is projected onto the polymolecule film 111 can be changed by moving the reflector set 160 alone without moving the heating device 130 or the carrying device 120. The reflector set 160 has lightweight and is easy to move, hence making the movement control of the heating source H easy.

Fourth Embodiment

Figure 14:
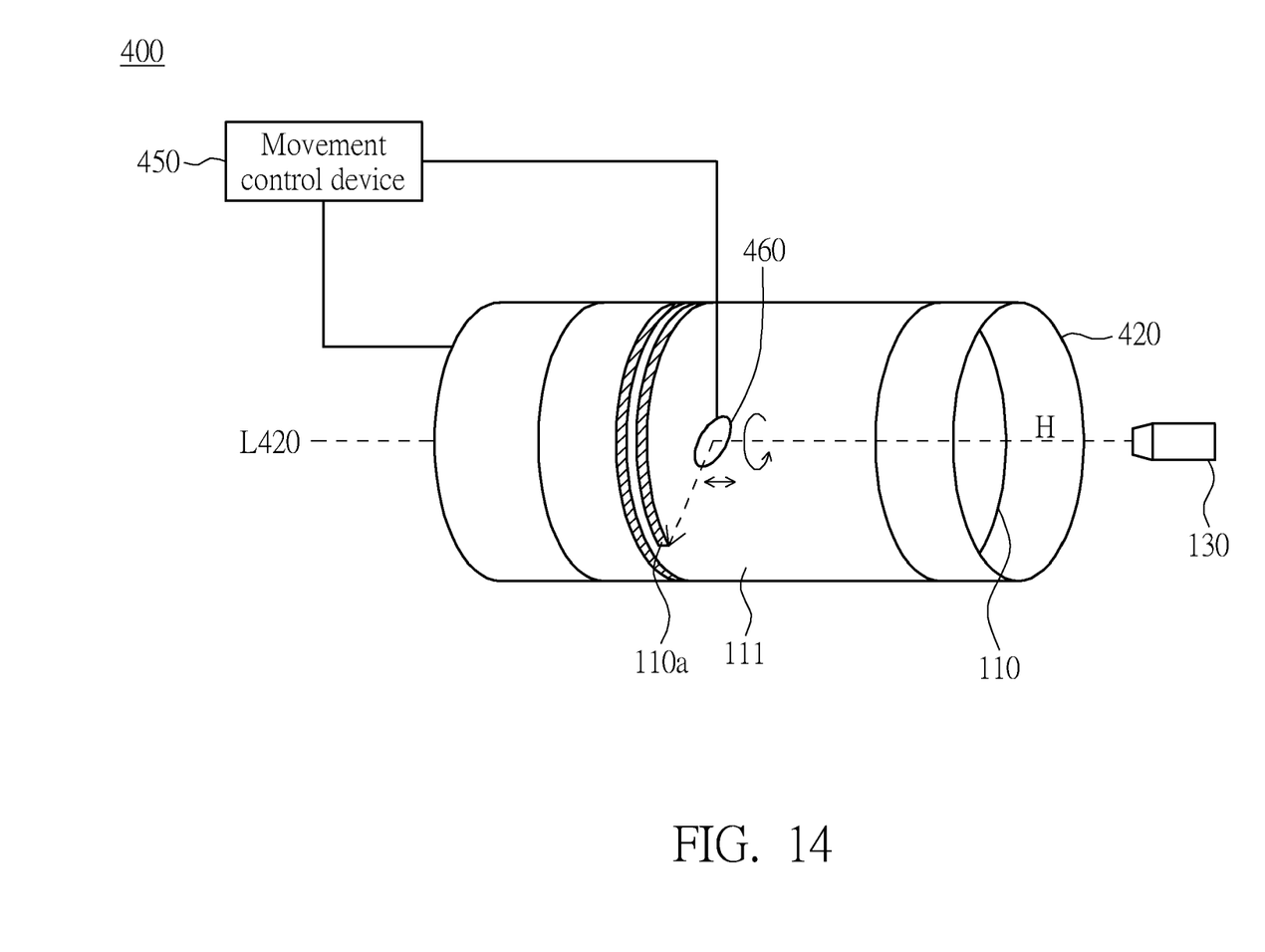
FIG. 14 shows a manufacturing system of a micro-retarder according to a fourth embodiment of the invention.

Referring to FIG. 14, a micro-retarder 110 of a manufacturing system 400 according to a fourth embodiment of the invention is shown. The manufacturing system 400 of the micro-retarder 110 of the present embodiment of the invention and the method for manufacturing the same differs from the manufacturing system 100 of the micro-retarder 110 of the first embodiment and the method for manufacturing the same in that the carrying device 420 is a hollowed barrel, and other similarities are not repeated here.

The carrying device 420 has a central axis L420. The polymolecule film 111 is disposed on the inner wall of the carrying device 420. The reflector set 460 is disposed on the central axis L420, so that the heating source H reflected via reflector set 460 is projected onto the polymolecule film 111. The movement control device 450 is used for controlling the carrying device 420 to continue rotating around the central axis L420, so that the position on which the heating source H is projected onto the polymolecule film 111 moves along the surface of the polymolecule film 111. When the carrying device 420 rotates around the central axis L420 for a cycle, the heating source H also heats along a bar-shaped partial area 110a so as to resume the partial area 110a of the polymolecule film 111 to be optically isotropic.

In addition to controlling the carrying device 420 to continue rotating around the central axis L420, the position on which the heating source H is projected onto the polymolecule film 111 can move along the surface of the polymolecule film 111 by way of controlling the reflector set 460 to rotate around the central axis L420. The user can choose either way according to the needs of actual product and facilities.

Besides, the movement control device 450 further controls the reflector set 460 to move back and forth with respect to the heating device 130 along the central axis L420. When the reflector set 460 relatively moves the heating device 130 along the central axis L420, the position on which the heating source H is projected onto the polymolecule film 111 is shifted to another bar-shaped partial area 110a, so that the heating source H heats several partial areas 110a of the polymolecule film 111.

When controlling the rotation of the carrying device 420, there is no need to reduce the speed or accelerate, and the rotation is facilitated by momentum. Moreover, the reflector set 460 only needs to relatively move the heating device 130 back and forth along the central axis L420. Thus, the movement control of the heating source H is made easy.

The design of the system for manufacturing a micro-retarder and a method for manufacturing the same disclosed in the above embodiments of the invention combines a movement control device, a measuring device, a cooling device, a polarization adjusting device and a reflector set, not only making the macromolecule direction in the heated partial area of the micro-retarder significantly different that in the unheated partial area but also possessing many advantages exemplified below.

Firstly, the energy formed in the central area of the heating source is smaller than that in the peripheral area. Thus, after the heating source completes heat treatment on a partial area, the energy received in everywhere of the partial area is the same, so that the moleculous arrangement in the heated partial area is significantly different that in the unheated partial area.

Secondly, the measuring device is used for measuring the heating energy of the heating source. The heating device adjusts the driving energy of the heating device according to the heating energy, so that the heating energy of the heating source remains stable over the time.

Thirdly, the cooling device is used for cooling the heated partial area, so that the heat of the heated partial area will not be diffused to the unheated partial area. Thus, the moleculous arrangement in the heated partial area is significantly different that in the unheated partial area.

Fourthly, the polarization adjusting device adjusts the polarized angle of the laser beam according to the optical axis direction of the polymolecule film, so that when the laser beam is projected onto the polymolecule film, the heat diffusing speed of the polymolecule film is reduced. Thus, the moleculous arrangement in the heated partial area still remains significantly different from that in the unheated partial area.

Fifthly, when the laser beam outputted by the heating device adopts $TEM_{01}$, the energy formed in the central area of the laser beam is deflected by a conical lens, so that the energy formed in the central area of the laser beam is also smaller than that in the peripheral area.

Sixthly, the movement control device further can control the movement of the reflector set so as to change the reflection path of the heating source. As the reflector set has lightweight and is easy to move, the movement control of the heating source is made easy.

Seventhly, the shape of the carrying device can be hollowed barrel and is driven by the movement control device to rotate continuously. When controlling the rotation of the carrying device, there is no need to reduce the speed or accelerate, and the rotation is facilitated by momentum. Moreover, the reflector set only needs to relatively move the heating device back and forth along the central axis. Thus, the movement control of the heating source is made easy.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a micro-retarder, comprising: providing an optically anisotropic polymolecule film; providing a heating source; providing a conical lens and a focusing lens for deflecting an energy formed by the heating source, the energy to be applied to the polymolecule film, so that the energy formed in the central area of the heating source is smaller than that in the peripheral area of the heating source, wherein the energy changes to a valley distribution curve from a Gaussian distribution curve through the conical lens and changes to an inverse Gaussian distribution curve from the valley distribution curve through the focusing lens, so that the energy formed in the central area of the laser beam is smaller than that in the peripheral area; and relatively moving the polymolecule film and the heating source along a first direction, so that the heating source heats at least one partial area of the polymolecule film along the first direction and resumes the partial area of the polymolecule film to be optically isotropic.

2. The method for manufacturing a micro-retarder according to claim 1, further comprising:
relatively moving the polymolecule film and the heating source along a second direction substantially perpendicular to the first direction, so that the heating source heats a plurality of partial areas and that the polymolecule film forms a plurality of heated partial areas and unheated partial area, wherein the heated partial areas and the unheated partial areas are all extended along the first direction and alternated with each other.

3. The method for manufacturing a micro-retarder according to claim 1, wherein the heating source is a laser beam, an infra-red light, an ultra-sound wave, an electron beam or a neutron beam.

4. The method for manufacturing a micro-retarder according to claim 1, further comprising:
measuring a heating energy of the heating source; and
adjusting a driving energy of the heating device according to the heating energy of the heating source, so that the heating energy of the heating source remains stable over the time.

5. The method for manufacturing a micro-retarder according to claim 2, wherein the step of adjusting the heating source comprises:
if the heating energy drops to a first level from a predetermined level, then increasing the driving energy of the heating device until the heating energy resumes the predetermined level; and
if the heating energy has increased to a second level, then decreasing the driving energy of the heating device until the heating energy resumes the predetermined level.

6. The method for manufacturing a micro-retarder according to claim 4, further comprising:
cooling the heated partial area.

7. The method for manufacturing a micro-retarder according to claim 6, wherein the heating source is a laser beam, the method for manufacturing a micro-retarder further comprises:
adjusting a polarized angle of the laser beam according to the optical axis direction of the polymolecule film.

* * * * *